INVENTORS
WILMER J. WINGATE &
CLARENCE A. WINGATE
BY
ATTORNEYS

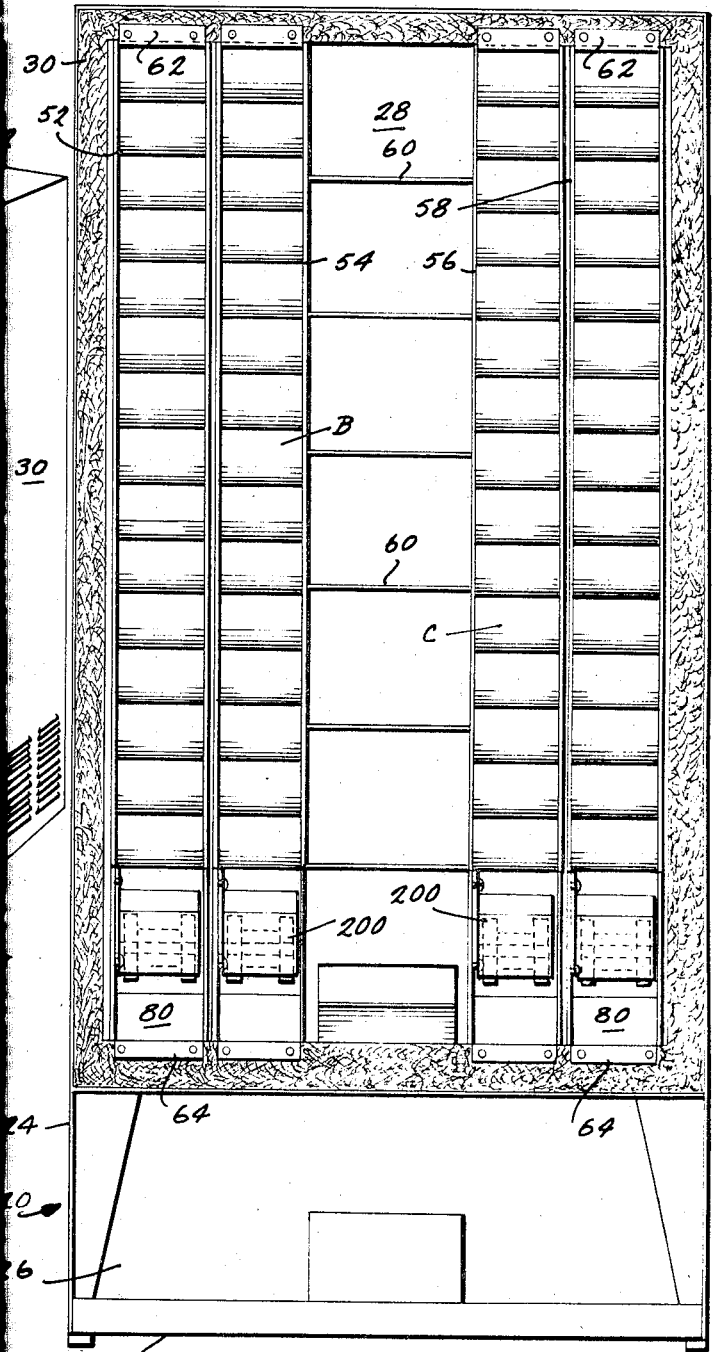

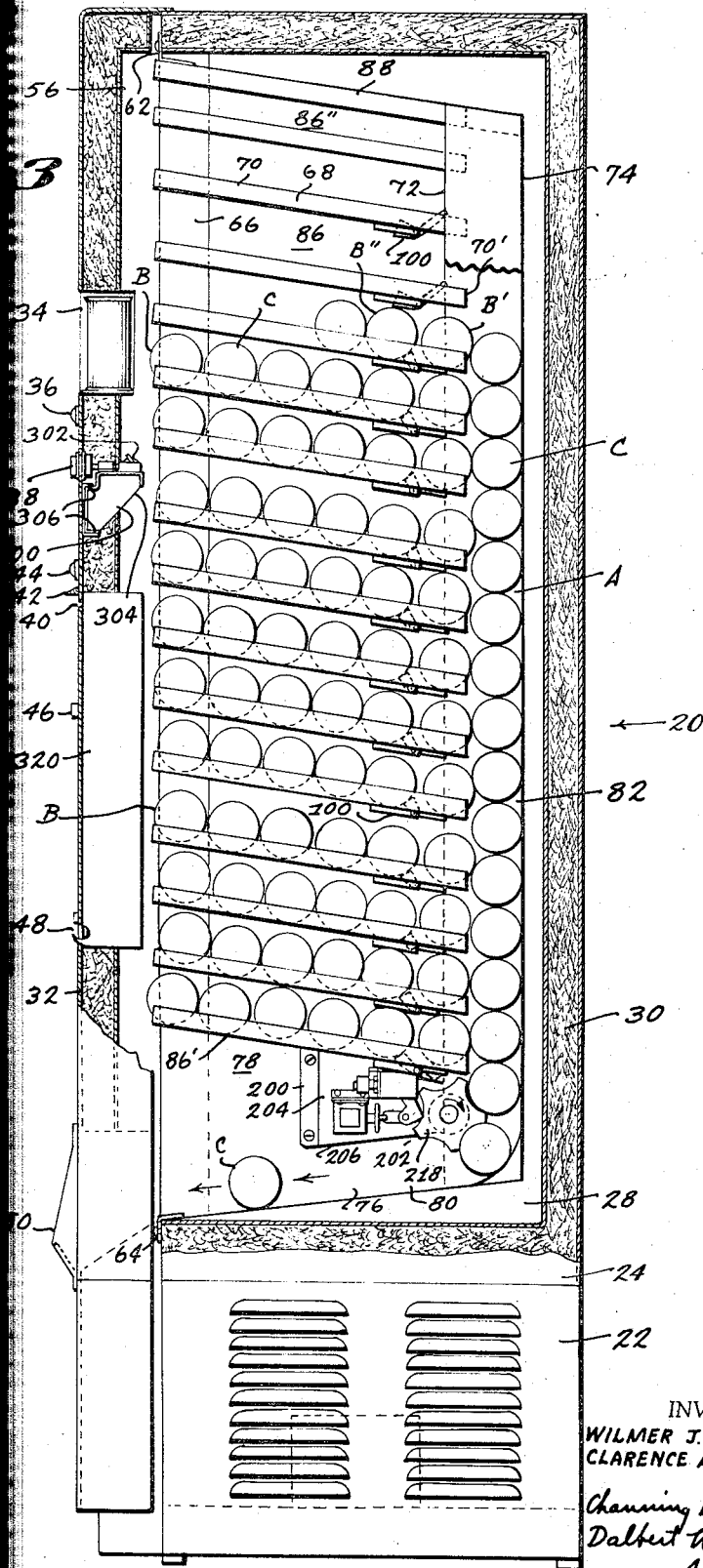

Feb. 13, 1968   W. J. WINGATE ET AL   3,368,714
DISPENSING MECHANISM
Filed Dec. 30, 1965   5 Sheets-Sheet 4
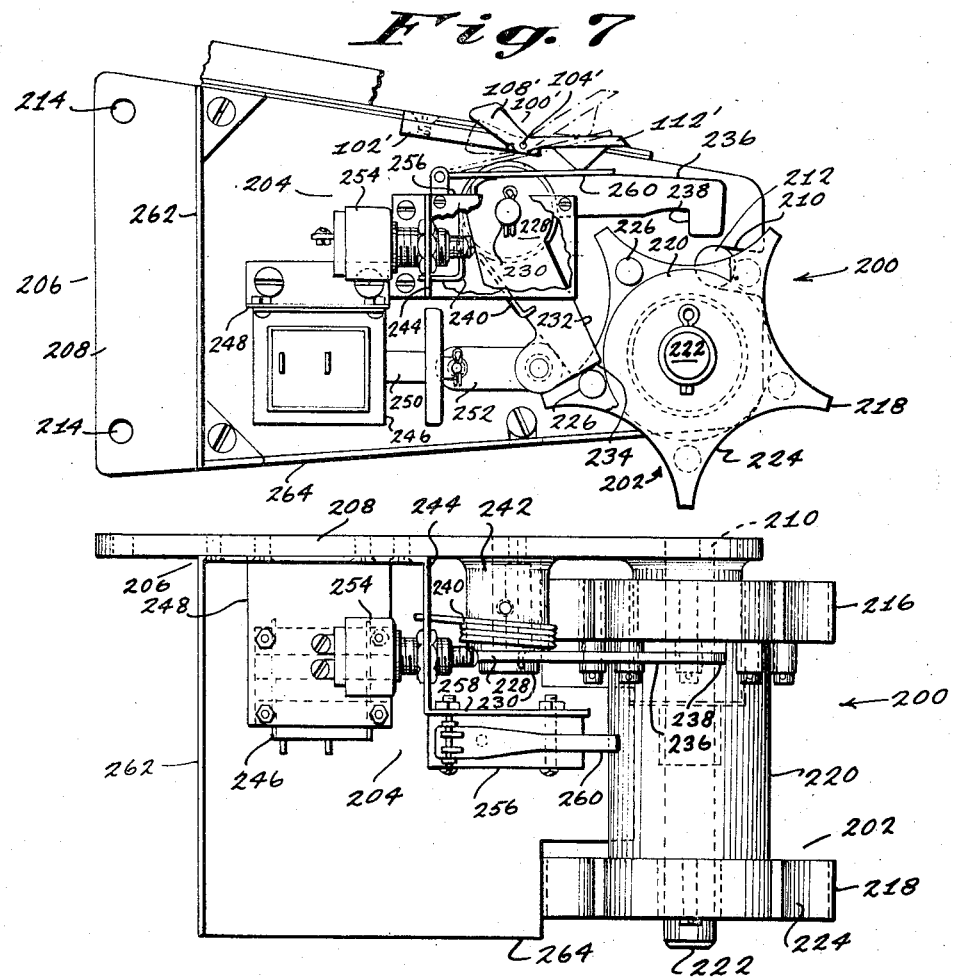
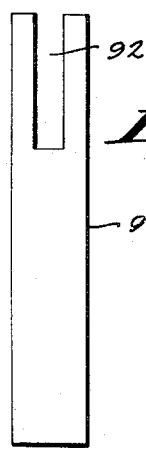
INVENTORS
WILMER J. WINGATE &
CLARENCE A. WINGATE
BY
Channing L. Richards &
Dalbert U. Shefte
ATTORNEYS

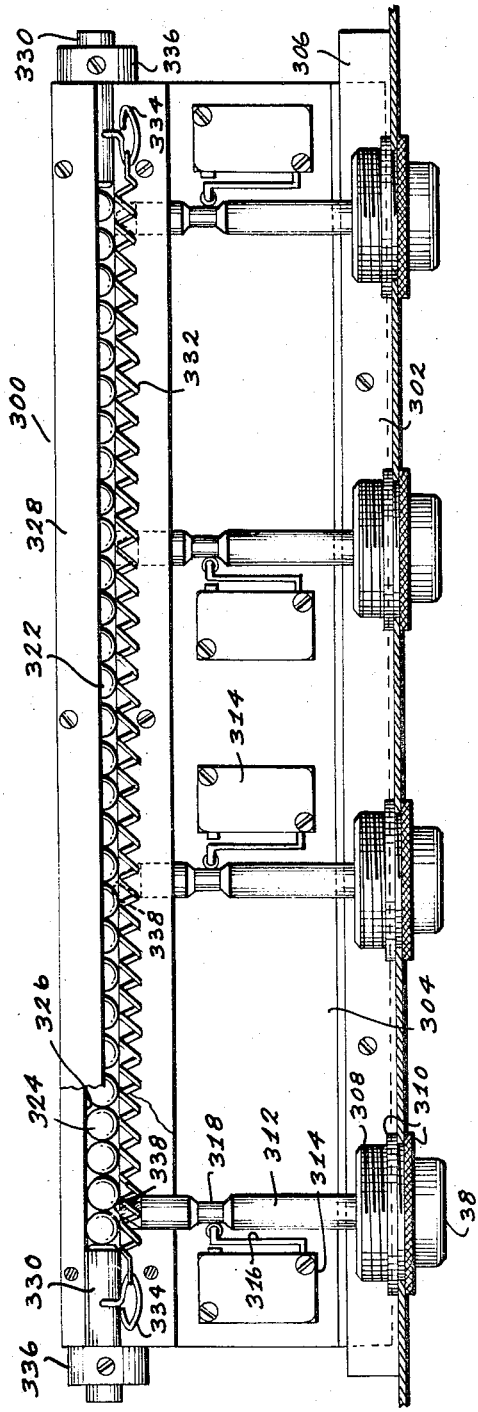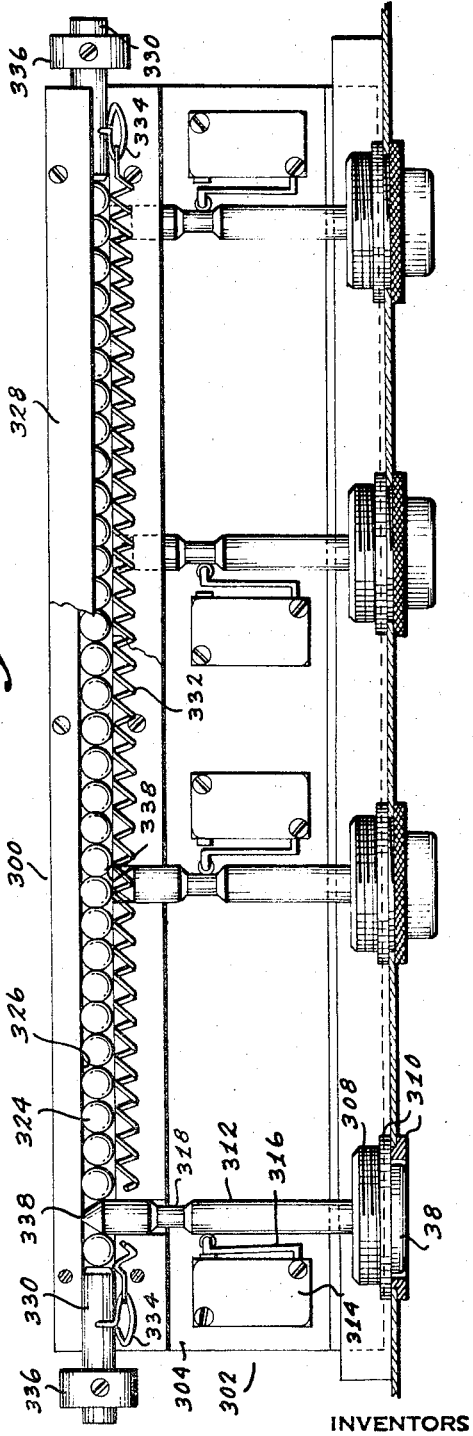
INVENTORS
WILMER J. WINGATE &
CLARENCE A. WINGATE
BY
*Channing P. Richards*
*Dalbert U. Shefte*
ATTORNEYS

United States Patent Office 3,368,714
Patented Feb. 13, 1968

3,368,714
DISPENSING MECHANISM
Wilmer Jack Wingate and Clarence A. Wingate, both
% Wingate Manufacturing Co., 4750 Airport Drive,
Charlotte, N.C. 28208
Filed Dec. 30, 1965, Ser. No. 517,777
6 Claims. (Cl. 221—108)

The present invention relates to a mechanism for dispensing articles from a stored supply, and more particularly to a dispensing mechanism of compact and simple construction designed for reliable and efficient operation.

Briefly described, the dispensing mechanism of the present invention includes a gravity feed system for storing articles compactly in large numbers and for dispensing the articles by gravity without requiring independent power means other than simple escapement means. This gravity feed system comprises a gravity feed main supply chute disposed for containing a column of articles, escapement means at the lower end of the supply chute for dispensing articles singly therefrom, and a plurality of inclined storage ramps arranged along the main supply chute and opening thereinto for storing articles in each ramp when the article column in the supply chute extends therebeyond and for supplying articles by gravity from each ramp to the upper end of the article column as the upper end of the column progresses past the storage ramp. This arrangement of inclined storage ramps opening into a main supply chute provides for compact storage and feeding of articles with the weight of the articles providing sufficient gravity force for operating the escapement means but without undue pressure on the article supply even when a large number of articles are in the supply. In addition, this arrangement permits the use of a stop plate conveniently insertable under the articles in a particular ramp and into the main chute to block the passage of articles so that repair or replacement of the escapement means can be accomplished without the tedious removal of all of the articles from the mechanism.

The aforementioned escapement means preferably includes article separating means operable by the gravity force of the article column in the supply chute to advance the leading article to an inclined discharge chute and selectively actuated operating means operable to permit advancement of the separating means to discharge articles singly upon each actuation of the selectively actuated means. The article separating means and the selectively actuated means may be mounted on a common supporting member for convenient insertion or removal from the dispensing mechanism as a unit, thereby avoiding the usual time-consuming effort required to remove a complicated operating mechanism in pieces from a conventional dispensing mechanism.

As the inclined storage ramps open into the main supply chute, there is the possibility of a row of articles in one of the storage ramps bearing against the column of articles in the main supply chute in such a manner as to block descent of the articles. To avoid this, while allowing the lead article in each ramp to rest against the column of articles in the supply chute in readiness for discharge thereinto, the present invention contemplates the use of article retaining means at the ramps retainingly engageable with the article following the lead article to separate the lead article so that it can rest against the article column in the supply chute free of the pressure of the other articles in the ramp, and being operable upon movement of the lead article into the chute to release the following article for advancement into lead article position.

A plurality of the foregoing supply chutes may be included in a single mechanism to provide for selective dispensing of different size, style, or content articles from a single machine, in which case escapement or discharge means are provided at each chute with operating means for operating each of the discharge means to dispense articles selectively from the chutes. The operating means are actuated selectively in the present invention by means that function to prevent actuation of more than one discharge means at one time so that attempts to obtain articles from more than one chute upon each actuation would be futile. This actuating means comprises a plurality of individually movable selector plungers with which are associated means responsive to movement of each plunger to actuate the operating means for selective dispensing of articles from the supply chute corresponding to the selected plunger. The plungers are disposed in spaced parallel relation with plunger blocking means extending across the paths of movement of the plungers and shiftable laterally with respect thereto. The plunger blocking means has blocking portions that block movement of the plungers when in the paths thereof and adjacent portions that permit plunger movement when aligned with the path of movement thereof. These adjacent portions are engaged by a plunger upon movement thereof to shift the entire blocking means to dispose the blocking portions in the paths of the other plungers to prevent actuating movement thereof. The blocking means are yieldably retained with the adjacent portions in the paths of plunger movement to permit any desired plunger selection.

The features and advantages of the present invention, as incorporated in a can vending mechanism according to the preferred embodiment, are described at length below and illustrated in the accompanying drawings, in which:

FIG. 1 is a perspective view of a can vending mechanism according to the preferred embodiment of the present invention;

FIG. 2 is a front elevation of the mechanism of FIG. 1 with the front panel removed;

FIG. 3 is a side elevation, partially in section, of the mechanism of FIG. 1;

FIG. 7 is an enlarged side elevation of the escapement means unit shown at the bottom of the chute in FIG. 3;

FIG. 8 is a plan view of the escapement means unit of FIG. 7;

FIG. 9 is an enlarged plan view of the actuating means of the can vending mechanism of FIG. 1 showing the components in position prior to plunger actuation;

FIG. 10 is a view similar to FIG. 9 showing the components upon full actuation of a plunger; and FIG. 11 is a plan view of a stop plate insertable in a ramp of the mechanism of the above-described figures to block passage of cans.

Figure 4:
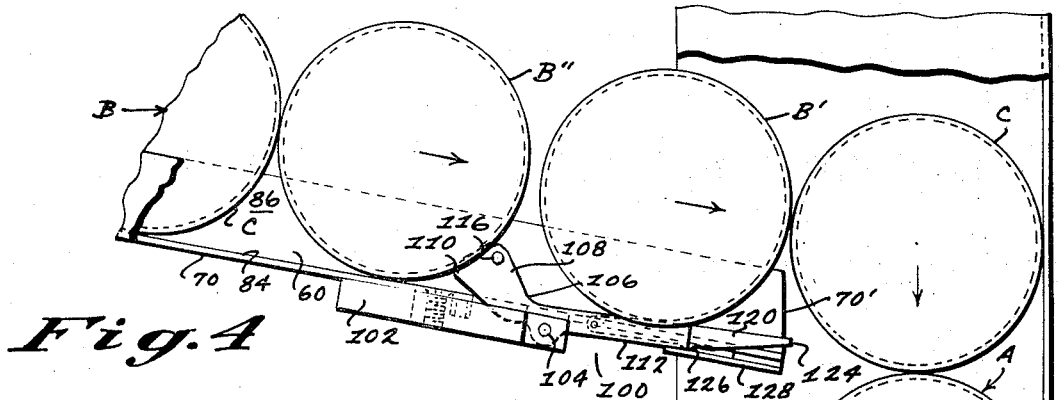
FIG. 4 is an enlargement of a portion of FIG. 3 showing the components at the juncture of a storage ramp with the main supply chute when the column of cans extends beyond the ramp.

The illustrated can vending mechanism 20 is of the coin-operated type used to vend cold soft drinks in cans and comprises generally a housing 22 that encloses a lower chamber 24 in which a conventional refrigeration unit, indicated diagrammatically at 26, is located and an upper storage chamber 28 that is refrigerated by the refrigeration unit 26 and has insulated walls 30. The front wall 32 of the housing is hinged to form a door to permit access to both the lower chamber 24 and the upper chamber 28 and has mounted thereon a display case 34 containing one can of each variety of soft drink contained in the storage chamber 28, a series of lights bulbs 36 used to indicate when the machine is out of the corresponding variety of soft drink can, a series of selector buttons 38 used to select a can of a particular soft drink, a coin-deposit slot 40 protected by a shield 42, a light bulb 44 to indicate the type of coin required, a coin-returned lever 46, a coin-return receptacle 48, and a pair of can delivery trays 50 at which the selected cans are delivered upon each operation of the mechanism described below.

In the embodiment illustrated, the aforementioned upper storage chamber 28 contains four independent can storage and dispensing sections 52, 54, 56 and 58. All of these sections contain cans of the same shape and size and all of the cans in each section contain the same soft drink. The sections 52, 54, 56 and 58 are arranged in spaced pairs, each pair emptying into one of the delivery trays 50, with the pairs divided by a vertical series of shelves 60 on which a supply of cans can be stored. If desired, these shelves 60 can be eliminated and the entire mechanism made more compact by arranging the sections together without spacing therebetween.

Each section 52, 54, 56 and 58 is constructed as a single removable unit attached to the housing 22 at top and bottom flanges 62 and 64, respectively. The flanges are connected by a pair of spaced vertical side strips 66 to each of which are secured the forward ends of the sides 68 of a vertical series of angle strips 70 that extend rearwardly at a slight declination to securement to spaced vertical side panels 72 at the rear of the section, which side panels are connected to a rear wall panel 74 that is curved at the bottom and extends forwardly from the curvature at a slight declination to the bottom flange 64 to form an inclined bottom wall 76. Connected to this bottom wall 76 and extending upwardly to the lowest angle strip 70 and longitudinally between the side strips 66 and side panels 72 are a pair of side support plates 78.

These side plates 78 form with the inclined bottom wall 76 an inclined discharge chute 80 for rolling discharge of cans from the section to the corresponding can delivery tray 50. The upper rear end of this discharge chute 80 communicates with a vertical main supply chute 82 formed by the rear wall panel 74, the side panels 72 and the lower rear ends 70' of the angle strips 70, which terminate at a spacing from the rear panel slightly greater than the diameter of a can C so that a single column A of cans C can be contained in the supply chute 82 for discharge into the discharge chute 80.

The opposing side panels 72, side strips 66 and side plates 78 are spaced apart a distance slightly greater than the overall axial dimension of the cans so that when the cans are placed in the section with their axes horizontal they will be retained in single file.

The aforementioned angle strips 70 are arranged in a vertical row of opposing pairs with inwardly directed flanges 84 extending the lengths thereof for support of rows B and cans C at the chimes thereof, thereby forming a vertical row of inclined storage ramps 86 opening at the rear ends 70' of the angle strips 70 into the main supply chute 82 so that cans stored in each ramp 86 will feed by gravity into the main supply chute 82 as the column A of cans progresses past the ramp.

The ramps 86 are positioned at only a slight inclination, for example, 10°, sufficient for gravity rolling advance of the row B of cans without such gravity force as would cause jamming of the lead can B' of the row B between cans in the can column A in the main supply chute 82 so as to prevent advance of the cans in the column thereabove. The ramps are also arranged in close vertical spacing for compact utilization of the space for maximum can storage, but with the spacing preferably controlled so that a lead can B' will not be in the farthest possible advanced position with respect to the can column A, or, in other words, will not be in contact with two cans in the column at the same time, thereby minimizing the possibility of jamming. Because of the slight clearance necessary between the rows B of cans in the ramps 86 as compared with the contiguity of the cans in the column A it is necessary to occasionally increase the ramp spacing to avoid a can jamming condition. For example, in the embodiment illustrated, the spacing between the fourth and fifth, and ninth and tenth, from the bottom ramps is greater than between the other ramps.

The arrangemment of the ramps 86 with their upper ends disposed at the front wall 32 of the housing 22 provides easy access to the ramps for loading of cans therein and additionally permits the advantageous use of an elongated stop plate 90 (FIG. 11) insertable along a ramp and into the main supply chute 82 to stop the cans in the column A from moving therepast when it is necessary to remove the below-described escapement means 200 at the bottom of the main supply chute 82 or to gain access to a ramp or other component below the ramp in which the stop plate 90 is inserted. Thus, by the use of this stop plate 90 it is not necessary to perform the tedious operation of removing all of the cans in the mechanism to gain access to a particular component as all of the cans above the inserted stop plate will be held in place while the few cans therebelow are removed.

The stop plate 90 is of a width only slightly less than the ramp width so that it will be supported on the angle strips 70 when inserted and is of a length greater than the distance between the rear wall panel 74 and the front of the ramps so that a portion of the plate will remain out of the ramp for handy removal. Further, the stop plate 90 is formed with a slot 92 extending centrally from one end a distance and width sufficient to accommodate the below-described can retaining means 100 that is located in each ramp 86.

Figure 5:
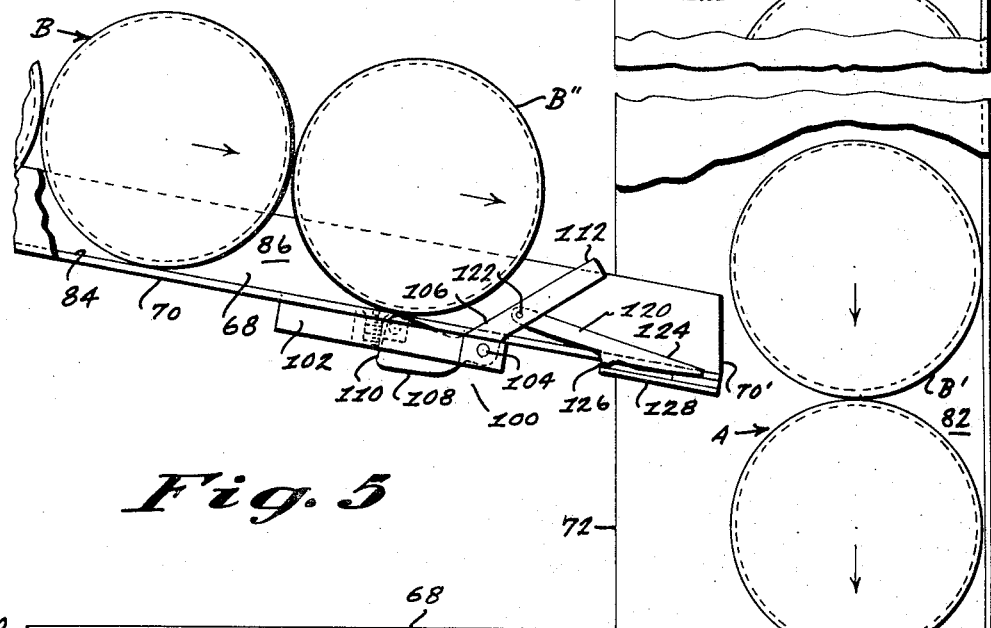
FIG. 5 is a view similar to FIG. 4 showing the cans as the lead can from the ramp has advanced into the can column.
Figure 6:
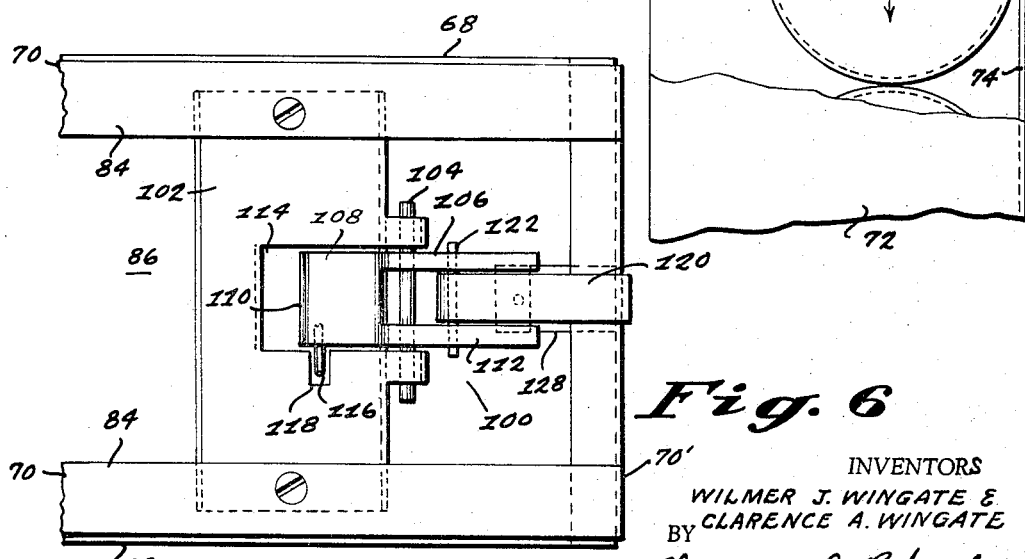
FIG. 6 is a plan view of the end of the ramp of FIGS. 4 and 5 with the cans removed.

To preclude the possibility of jamming more positively, the preferred embodiment includes can retaining means 100 near the rear end 70' of each ramp 86 (except the top ramp) as illustrated in general in FIG. 3 and in detail in FIGS. 4, 5 and 6. Each can retaining means 100 includes a support bracket 102 secured to the underside of the opposing ramp flanges 84 and extending therebetween below the path of the row B of cans in the ramp 86. The bracket supports a transversely extending horizontal pivot pin 104 below the path of the cans and on which is pivotally mounted a gate 106 that has a can retaining arm 108 extending from the pin 104 forwardly and upwardly to an enlarged can engaging face 110 that is normally disposed in the path of the cans for abutment of the can B" following the lead can B' in the ramp 86 at a spacing from the can column A in the main chute 82 greater than a can diameter so that the lead can B' can rest against the can column A free of the pressure of the row B of cans in the ramp and free to move up the ramp slightly as it rides on the surface of the cans moving down the main supply chute 82 (FIG. 4).

The can retaining arm 108 engages the following can B" low enough so that if it were not otherwise held in position it would be forced downwardly by the following can B" out of abutting engagement therewith such that the following can would move down the ramp. To hold the can retaining arm 108 in can retaining position when a lead can B' is in the ramp, the can retaining gate 106 is provided with a control arm 112 extending rearwardly from the pivot pin 104 under the lead can B', which lead can prevents upward pivoting of the control arm 112 and thereby prevents downward pivoting of the can retaining arm 108 until the lead can B' moves into the can column A in the main chute 82, at which time the following can B" forces the can retaining arm 108 downwardly into a recess 114 in the support bracket 102, thereby freeing the following can B" to move into lead can position (FIG. 5), in doing which it engages the control arm 112 to again pivot the can retaining arm 108 into can engaging position. The gate 106 is prevented from inadvertent excessive pivoting by a stop finger 116 extending laterally from the can retaining arm 108 and receivable in a pocket 118 in the support bracket 102 at the side of the recess 114, with the bottom of the pocket 118 serving as a stop for the finger 116.

To assure pivoting of the gate 106 by positively initiating such pivoting, an actuating lever 120 is pivoted on a shaft 122 on the control arm 112, which is bifurcated for this purpose. The actuating lever 120 extends along the ramp 86 toward the main chute 82 and has the underside of its rearward free end 124 tapered to allow downward rocking of the end 124 about a projection 126 on the lever forwardly of the free end thereof. The projection 126 is supported on a transverse platform 128 secured to and extending between the rear ends 70′ of the ramp flanges 84, which platform 128 also serves as a support for the tapered lever end 124 upon fulcruming of the lever about the projection 126. The platform 128 normally supports the actuating lever 120 so that the free end 124 thereof extends slightly upwardly into the path of the lead can B′ so that as the lead can advances into the main chute 82 it forces the lever end down to fulcrum and lever about the projection 126 thereby raising the pivot end of the lever to force the control arm 112 upwardly and in turn force the can retaining arm 108 downwardly to release the following can B″ for advancement into lead can position.

The can retaining means 100 (FIG. 7) in the bottom ramp 86′ is similar to the other can retaining means 100, having a similar support bracket 102′, pivot pin 104′ and can retaining arm 108′. The control arm 112′ is similar in that it extends under the lead can for the same purpose, but it differs in that there is no actuating lever attached thereto and additionally it is formed with a downward extension 130 that rests on a switch finger 260 of the below-described escapement means 200, which switch acts to disable the escapement means when the bottom ramp 86′ has been emptied and otherwise serves to urge the control arm 112′ upwardly to initiate downward pivoting of the can retaining arm 108′ when the lead can has advanced away from the control arm 112′.

As the can column A in the main chute 82 does not extend beyond the top ramp 86″ there is no jamming problem thereat and no can retaining means is necessary. The top ramp 86″ also differs from the other ramps as it is formed with additional and inverted angle strips 88 along the upper edge thereof and extending over the chimes of the row of cans to maintain the cans in proper position in the ramp 86″.

The cans C in the column A in the main supply chute 82 of each section 52, 54, 56 and 58 are dispensed singly from the lower end of the column by the escapement means 200 (FIGS. 7 and 8) located at the juncture of the main supply chute 82 and the inclined delivery chute 80 (FIG. 3) and comprising generally can separating means 202 that separate cans C singly from the bottom of the column A and selectively actuated operating or release means 204 that controls operation of the separating means 202 and is mounted therewith on a common supporting member 206 to form an integral unit that can be readily removed for repair or replacement.

The supporting member 206 of the illustrated embodiment comprises primarily a vertical mounting plate 208 shaped to fit along the side of the discharge chute 80 and having a recess 210 at its rear end for mounting on a horizontal lug 212 protruding from one of the side panels 72. The front end of the mounting plate 208 has apertures 214 for receipt of screws or other convenient means to attach the mounting plate to the adjacent side support plate 78 of the section. The mounting plate 208 supports directly or by means of brackets all of the components of the can separating means 202 and release means 204 compactly within substantially the planes of the ends of the cans in the section so that the components are within the lateral extent of the discharge chute 80 and do not interfere with the adjacent sections and permit convenient removal of the unit without disassembly of the components thereof.

The aforementioned can separating means 202 includes a pair of spaced star wheels 216 and 218 mounted on a common hub 220 extending therebetween and in turn journalled for rotation on a horizontal shaft 222 fixed on the mounting plate 208 at an offset from the can column A so that the star wheel pockets 224 will engage the cans and advance them along the curvature of the rear wall panel 74 for release into the discharge chute 80. The star wheels 216 and 218 are located axially in close proximity to the chimes of the cans C for reliable engagement and control thereof.

The star wheels 216 and 218 are rotated by the gravity force of the can column A, with stepwise advance to dispense cans singly being controlled by the release means 204 that allows advancement sufficient to discharge only one can upon each actuation of the release means 204.

The release means 204 comprises a plurality of star wheel studs 226 secured to the star wheel 216 that is adjacent the mounting plate 208 and extending toward the other star wheel 218, with a stud 226 being located adjacent each star wheel pocket 224 in the space between pockets and radially inward of the overall periphery of the star wheel pockets out of can contact. These studs 226 are engaged by a bell crank 228 mounted on a rocker shaft 230 extending from the mounting plate 208 parallel to the star wheel shaft 222 and offset upwardly and forwardly therefrom to dispose the bell crank 228 out of the path of the cans. The bell crank 228 has a star wheel positioning arm 232 that is formed with an end face 234 disposable in the path of stud movement and against which a star wheel stud 226 will abut to hold the star wheel 216 in a proper inoperative position (FIG. 7) in readiness for dispensing of a can C from a star wheel pocket 224 upon subsequent disengagement of the positioning arm 232 from the stud 226.

The bell crank 228 is further provided with a stud latching arm 236 that has a latch finger 238 disposed out of the path of the star wheel studs 226 when the positioning arm 232 is in engagement with a stud 226 and movable into the path of the studs for engagement of a stud to limit advancement of the star wheel when the bell crank is rocked to disengage the positioning arm 232. When the bell crank 228 is rocked back to return the positioning arm 232 in the path of the studs the latching arm 236 moves out of stud latching engagement to release the star wheel 216 to complete its dispensing advancement until the next stud abuts the positioning arm face 234. Thus the latching arm 236 serves as an antijackpot control to assure dispensing of only one can upon each actuation of the release means 204 and to prevent free rotation of the star wheel should the positioning arm 232 remain disengaged upon a malfunction of the release means 204.

The bell crank 228 is normally urged to dispose the positioning arm 232 into stud engaging position by a helical spring 240 that is mounted on a post 242 extending from the mounting plate 208 for support of the rocker shaft 230. This spring 240 has one end biased against the positioning arm 232 and its other end biased under a bracket 244 extending from the mounting plate 208.

Operation of the bell crank 228 against the spring pressure to release the star wheel 216 for can dispensing is accomplished by a solenoid unit 246 mounted on a support 248 extending from the mounting plate 208. The solenoid unit 246 has an operating rod 250 extending toward the positioning arm 232 of the bell crank 228 and connected thereto by a link 252 so that upon energization of the solenoid unit 246 the rod 250 will be drawn into the unit and thereby rock the bell crank 228 to disengage the positioning arm 232 and move the latch finger 238 into stud latching position.

The solenoid unit 246 is de-energized to permit return of the bell crank 228 as soon as the positioning arm 232 has moved out of stud engagement by the actuation of a limit switch 254 mounted on the aforementioned spring biasing bracket 244 and having an operating plunger engageable by the back edge of the positioning arm 232 of the bell crank 228 when the positioning arm has been rocked to its disengaged position.

The solenoid unit 246 and limit switch 254 are connected in a conventional manner in an electrical control circuit of any of the conventional types used commonly in coin-operated vending machines. Also connected in a conventional manner in the electrical circuit is a cut-off switch 256 that is mounted on an extension 258 of the bracket 244 so that its operating finger 260 will, as described heretofore, be engaged by the extension 130 of the control arm 112′ of the can retaining means 100′ on the bottom can storage ramp 86′. When there are cans C in the ramp 86′ they will hold the control arm 112′ down, maintaining the finger 260 in switch closing position, but when the ramp 86′ is empty the weight of the control arm 112′ is insufficient to hold the finger down and it will rise, thereby opening the switch to de-energize the solenoid portion of the electrical circuit.

The above-described operating components of the release means 202 are protected so that they cannot be forced to operate by someone reaching through the opening at a can delivery tray 50 by a front shielding panel 262 and a bottom shielding panel 262 secured to the mounting plate 208 and extending across substantially the full width of the discharge chute 78.

There is one of the aforesaid escapement means 200 in each of the can storage and dispensing sections 52, 54, 56, and 58 and they are actuated selectively to dispense a can from a selected section by actuating means 300 that responds to pressing of one of the selector buttons 38 by a customer following deposit of the proper coin or coins. The selector buttons 38 are part of a selector unit 302 (FIGS. 3, 9, and 10) mounted on a platform 304 that is removably attached between brackets 306 on the interior of the front wall 32 of the housing 22. The selector buttons 38 are exposed on the exterior of the front wall 32 in sockets 308 that are recessed in the wall and locked thereto by a pair of lock nuts 310 threaded thereon, which clamp the wall therebetween. The selector buttons 38 are mounted on the ends of selector plungers 312 that extend inwardly in spaced parallel relation. A plunger responsive means in the form of an electrical switch 314 is mounted on the platform 304 adjacent each plunger 312 with the operating lever 316 of each switch riding on the adjacent plunger. The switch lever 316 normally contacts the plunger 312 at a reduced diameter portion 318 that allows the switch to remain normally open, but when the selector button 38 is pushed the plunger advances, causing the switch lever 316 to ride out of the reduced diameter portion 318, thereby closing the switch 314, which acts in combination with a conventional coin mechanism, indicated diagrammatically at 320, through a conventional electrical circuit to actuate the release means 204 in the can storage and disenpsing section 52, 54, 56, or 58 corresponding to the particular plunger that has been selected.

To prevent dispensing of a can from more than one section for each coin deposit, the actuating means 300 of the present invention includes plunger blocking means 322 extending across the paths of movement of the plungers 312 and laterally shiftable upon movement of one plunger to block movement of the other plungers. The plunger blocking means 312 has blocking portions that prevent plunger movement when disposed in the path of plunger movement and adjacent portions that permit plunger movement and are engaged by movement of one plunger to shift the blocking portions into alignment with the other plungers.

In the illustrated embodiment, the blocking means 312 comprises a plurality of separable blocking elements or balls 324 contained within a transverse channel 326 on the platform 304 in an abutting series extending normal to the paths of the plungers 312. A cover plate 328 extends over the channel 326 to retain the balls 324 therein and yieldable retaining means in the form of end plugs 330 held by a coil spring 332 attached to hooks 334 on the plugs and extending therebetween hold the balls in abutting relation. The plugs 330 extend into the ends of the channel 326 and have enlarged stops 336 that seat at the channel ends to fix the orientation of the balls in the channel so that balls will be abutting at each of the plungers 312 (FIG. 9) which have flat inner ends 338 and are tapered away therefrom for wedging engagement between abutting balls to force them apart against the bias of the spring 332 upon inner movement of the plunger. The balls are preferably formed to a diameter substantially equivalent to the diameter of the plungers such that the displacement of the balls resulting from a plunger advance will shift the balls at the other plungers one-half of one diameter, thereby disposing their centers generally in line with the paths of plunger movement (FIG. 10). The abutment of the balls form the aforementioned adjacent portions of the blocking means that permit plunger movement, and the center portions of the balls form the aforementioned blocking portions as when the ball centers are in line with the plungers the flat ends 328 of the plungers abut the balls and cannot advance or cause lateral shifting of the balls.

When a customer desires to obtain a can from the illustrated mechanism, the proper coin or coins must first be inserted through the coin-deposit slot 40 to actuate the coin mechanism 320 and then a selector button 38 may be pushed to energize through the actuated coin mechanism the solenoid unit 246 in the can storage and dispensing section 52, 54, 56, or 58 corresponding to the selected button. Energization of the solenoid unit 246 causes rocking of the bell crank 228 to release the star wheels 216 and 218 to advance sufficiently to dispense a single can C to the delivery tray 50. Rocking of the bell crank 228 also causes actuation of the limit switch 254 to de-energize the solenoid unit 246, which allows the spring 240 to return the bell 226 to its star wheel holding position at which it remains until another proper coin deposit is made and a selector button is pushed.

Upon each stepwise advance of the star wheels 216 and 218 to dispense a single can, the cans in the column A in the main supply chute 82 shift downwardly one can position and the lead can B′ from the uppermost row B of cans in the ramps 86 feeds into the main chute 82 at the upper end of the can column A and in doing so releases the can retaining gate 106 to allow the following can B″ to move into lead can position, in doing which it causes the gate to move back into can retaining position.

The can in all the rows below the top row remain in the ramps 86 with the lead cans resting against the can column A and holding the gates 106 in can retaining position to relieve the lead cans from the following cans. When the can row is emptied, the end of the can column A progresses downward to the next ramp and the cans therein are then fed to the column.

The ramps 86 can be refilled with cans at any time simply by opening the front wall 32 and inserting cans in the ramps. If the ramps have not been refilled before the bottom ramp 86′ has been emptied, the cut-off switch 256 will be released by the can retaining means 100′ in the bottom ramp to de-activate the escapement means 200 and light the bulb 36 under the corresponding can in the display case 34 to indicate that the mechanism is out of that variety of drink.

The foregoing detailed description of the dispensing mechanism of the present invention has been presented for purposes of illustration only and it should be understood that the details may be varied within the scope of the present invention. For example, the can storage and display sections 52, 54, 56 and 58 could be formed with full panel sides from which the ramps 86 could be formed integrally by a stamping and bending operation, or the star wheels 216 and 218 could be relocated closer to the delivery trays 50 for more rapid delivery of cans upon a dispensing operation, or the star wheels could be disposed farther apart for can chime engagement with the supporting member between star wheels and suspended from the ramp thereabove. Numerous other variations are within the intended scope, and the invention also may be incorporated in various devices other than can vending mechanisms. The scope of the present invention is not intended to be limited other than as defined in the appended claims.

We claim:

1. A dispensing mechanism comprising a gravity feed main supply chute disposed for containing a column of articles, escapement means at the lower end of said main supply chute for dispensing articles singly from the lower end of said article column, a plurality of inclined storage ramps arranged along said main supply chute and opening thereinto for storing articles in each ramp when the article column in the supply chute extends therebeyond and for supplying articles by gravity from each ramp to the upper end of the article column as the upper end of the column progresses past the storage ramp with the lead article in each ramp resting against the article column for ready discharge into the chute when the upper column end progresses thereto, and article retaining means at at least one of said ramps retainingly engageable with the article following said lead article in said ramp to separate the lead article from said following article and allow said lead article to rest against the article column in said chute free of the pressure of the row of articles, said article retaining means being operable upon movement of the lead article into said chute to release the following article for advancement into lead article position.

2. A dispensing mechanism according to claim 1 and characterized further in that said article retaining means has a portion engaged by the lead article as it moves into said chute to initiate operation of said article retaining means for release of the following article.

3. A dispensing mechanism according to claim 1 and characterized further in that each said article retaining means comprises an article retaining gate pivoted in at least one of said ramps between the lead article therein and the following article and having an article retaining portion extending rearwardly of the pivot for retaining engagement with the following article and a control portion extending forwardly of the pivot for engagement with the lead article, engagement of said control portion by said lead article maintaining said article retaining portion in retaining engagement with the following article to separate the lead article from the following article and to allow the lead article to rest against said article column free of the pressure of the row of articles in the ramp, movement of the lead article into said chute freeing said retaining gate to pivot to allow the following article to advance past the article retaining portion into lead article position.

4. A dispensing mechanism according to claim 3 and characterized further in that each said article retaining gate is pivoted below the path of article movement and has an article retaining arm extending from the pivot at an upward inclination into article retaining egagement with the following article and a control arm extending from the pivot under the lead article for releasable positioning of the article retaining arm by the lead article in article retaining engagement with the following article to separate the lead article from the following article, movement of the lead article into said main supply chute freeing said control arm for upward pivoting to allow said article retaining arm to pivot downwardly for release of the following article to advance to lead article position.

5. A dispensing mechanism according to claim 4 and characterized further in that said article retaining gate has an actuating lever connected to said control arm and extending outwardly therefrom into the path of movement of the lead article to the main supply chute for operating engagement by the lead article to actuate said lever to initiate pivoting of said gate upon said article engagement.

6. A dispensing mechanism according to claim 5 and characterized further in that said actuating lever is pivoted on said control arm and is fulcrumed outwardly therefrom for rocking to raise said control arm and thereby lower said article retaining arm upon operative engagement of said lever by said lead article.

References Cited

UNITED STATES PATENTS

| | | | |
|---|---|---|---|
| 1,280,441 | 10/1918 | Gonick | 221—295 X |
| 1,841,926 | 1/1932 | Zuehl | 221—75 |
| 2,002,753 | 5/1935 | Parks et al. | 221—109 X |
| 2,071,770 | 2/1937 | Shield. | |
| 2,496,689 | 2/1950 | Balzer | 221—295 X |

FOREIGN PATENTS

| | | |
|---|---|---|
| 1,284,855 | 1/1962 | France. |
| 330,276 | 5/1930 | Great Britain. |

SAMUEL F. COLEMAN, *Primary Examiner.*